April 29, 1952   R. P. GREEN   2,594,767
METHOD OF SEISMIC SURVEYING
Original Filed Nov. 1, 1943

INVENTOR.
ROBERT P. GREEN
BY Mueller & Mason
ATTORNEYS

Patented Apr. 29, 1952

2,594,767

UNITED STATES PATENT OFFICE 2,594,767

METHOD OF SEISMIC SURVEYING

Robert P. Green, Tulsa, Okla., assignor to Engineering Laboratories, Inc., Tulsa, Okla., a corporation of Oklahoma Original application November 1, 1943, Serial No. 508,590. Divided and this application February 8, 1946, Serial No. 646,341

8 Claims. (Cl. 175—183)

The present invention relates generally to the art of seismic surveying and more particularly to an improved method of recording and analyzing information obtained by the seismic reflection method. This application is a division of copending application Serial No. 508,590, filed November 1, 1943, now abandoned.

In general, the seismic reflection method of subsurface surveying comprises, initiating an impulse somewhere within the earth's crust and recording the resultant movement at a point more or less distant from the point of origin of the impulse, in such manner that the time elapsing between the instant of the impulse and the ensuing recorded movement may be determined. This method deals particularly with the seismic waves that are reflected from the underlying beds, as distinguished from refracted waves and other disturbances which will also be picked up by the recording device. It is of particular importance to consider the fact that the success of seismic surveying by the reflection method depends upon the ability of the observer to differentiate between the reflected energy and other energy arriving at the "Geophone," since the results depend essentially upon the accuracy of determining the instant of arrival of the reflected waves at the "Geophone." It has been found that in many areas the reflected waves are completely masked by refracted waves, ground roll disturbances, and various other sources of seismic noise.

In order to separate the reflected waves from the undesirable disturbances, advantage is taken of the frequency distribution of the various movements; that is, the frequencies of the reflected waves generally differ from the frequencies of refracted waves and other disturbances present. In order to produce legible seismic records that adapt themselves easily for geological interpretation, use has been made in the past of electrical filters in the recording circuits which are designed to transmit as efficiently as possible the frequencies of the reflected energy and to attenuate the frequencies resulting from refracted waves and other disturbances.

It is common knowledge to those skilled in the art that the frequency band of the reflected energy is different in various physical locations. In certain sections of the United States, for example along the coast of the Gulf of Mexico, the reflected energy generally covers a band of frequencies having maximum energy in the region of 35 cycles. In Mid-Continent areas, the reflected energy band of frequencies is shifted to a higher value with the middle of the band being in the region of 50 cycles, and in some cases substantially higher. This band of frequencies, however, regardless of the frequency of maximum energy, is in the nature of a continuous frequency band and not of separate frequency bands.

In prior seismic recording systems a simple filter arrangement having fixed electrical characteristics has been generally used. Such a system will not serve well in all sections of the country as it will not permit emphasis on the particular frequency band which contains the most information in the various regions. In order to obtain full advantage of the energy in the reflected waves in such a system, it is necessary to adjust the response of the filtering equipment to the particular band of frequencies furnishing the most information in a particular area. The response of the filter must be maximum in the region of 35 cycles for Gulf Coast work, and adjustable for higher frequencies for work in Mid-Continent areas. In order to determine the best filtering adjustments in a given territory several preliminary tests are necessary. Such tests are very expensive and not completely satisfactory because each test requires a separate shot with only one record being obtained from each shot, and if the filtering is found to be incorrect, additional shots are necessary. This introduces inaccuracies because it is not possible to duplicate exactly the size of the shot, the shooting and shot hole conditions, and the like and, accordingly, the results differ due to the varying conditions and the information obtained may be of little value.

It is an object of the present invention, therefore, to provide a method of seismic surveying whereby the aforementioned difficulties are avoided and overcome.

It is a further object of this invention to provide an improved method of seismic surveying in which all the impulse energy picked up is initially recorded and the recording is thereafter reproduced and the various frequency bands thereof containing the most information are selected by visual trace inspection and then re-recorded.

A feature of this invention is the recording of the earth vibrations produced by a seismic disturbance phonographically on a suitable recording medium and thereafter reproducing the recording into electrical signals under various filtering conditions and visually observing the traces under the varying conditions prior to re-recording.

A further feature of this invention is the provision of a system utilizing a variable speed motor for emphasizing the desired frequencies of a recorded seismic record.

Further objects, features, and advantages of the present invention will be apparent from the following description and reference to the accompanying drawings, in which.

Figure 1:
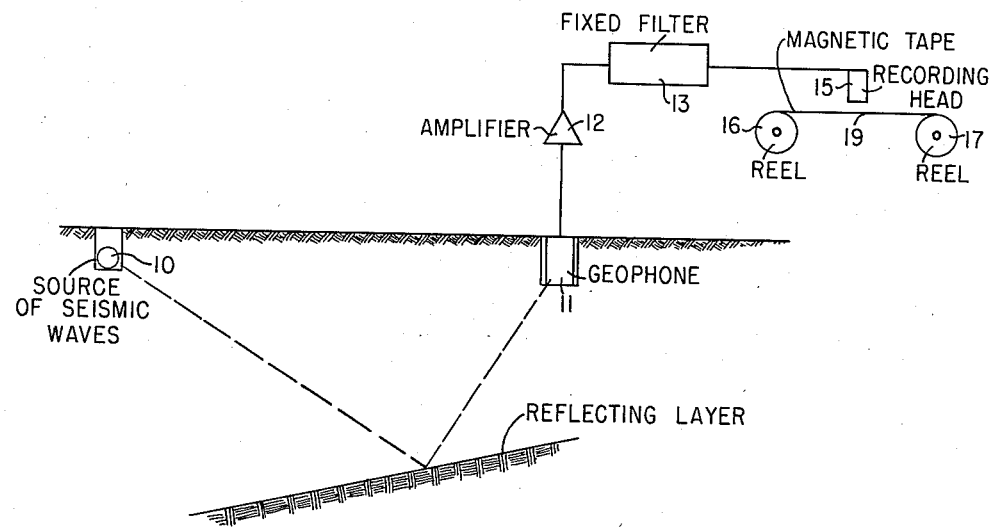
Fig. 1 shows the general arrangement embodying my invention, including a means for producing a disturbance in the earth, picking up vibrations caused thereby, and phonographically recording these vibrations.

Referring now more particularly to Fig. 1, elastic waves are generated by producing a disturbance in the earth as by detonating an explosive charge at the shot point 10. This charge may consist of any suitable detonating material, such as dynamite, in quantities depending upon the particular conditions in the area being explored. For the purpose of picking up the vibrations caused by the charge, a "Geophone" 11 is buried in the ground at a convenient distance from the shot point 10. This "Geophone" may be of any desired construction, such as the moving coil type, carbon button type, or piezoelectric type, and may have a resonant frequency of any desired number of cycles per second.

Waves emanating from the shot point 10 are in the form of complex wave trains, some of which travel directly to the "Geophone" 11 through the surface of the earth while others are transmitted downward to the interfaces of the substratum, from which they are reflected and detected by the "Geophone." Various detailed methods of accomplishing this result are well-known to those skilled in the art and will not be discussed here. The elastic waves generated by the charge 10 are translated into electrical currents by means of the "Geophone" 11 and amplified in the amplifier 12. For the purpose of eliminating currents of certain frequencies which do not contain useful information, the filter 13 is provided for transmitting, mainly, the frequency range which includes the contribution due to the reflected energy. The frequency range transmitted by the filter is, however, sufficiently wide to cover the frequency ranges of reflected energy in different sections of the country, as previously described. In order to record the currents transmitted by the filter 13 a magnetic recorder is provided. This recorder comprises a magnetic recording head 15 which receives energy from the filter and produces a record thereof upon a segment of a discontinuous magnetizable element in the form of a magnetic tape 19 running between supply and take up reels 16 and 17, which are driven in a conventional manner. Magnetic recorders of this type are commercially available and are familiar to those skilled in the art.

It is apparent, therefore, that by means of the arrangement illustrated in Fig. 1, a permanent and phonographically reproducible record of the earth vibrations is formed upon a segment of the magnetizable element 19 and that such vibrations may subsequently be repeatedly reproduced at any desired time and under such conditions that a maximum amount of information may be obtained with regard to the particular area which is being explored. The terms "phonographically reproducible" and "phonographic record" as used herein have the same connotation as defined in Rieber Patent No. 2,051,153.

Figure 2:
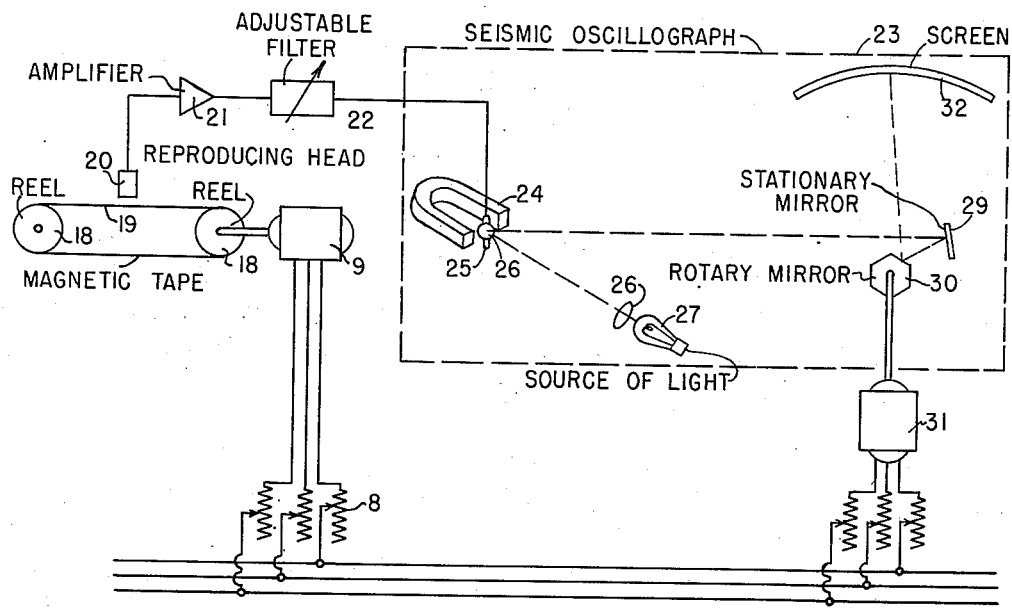
Fig. 2 shows schematically a system for reproducing the recording and modifying the reproduction thereof.

In order to reproduce the original vibrations for purposes of seismic interpretation, the record of the magnetic tape may be reproduced in the manner shown in Fig. 2 of the drawing. As illustrated schematically in this figure, the segment of the magnetizable element 19 upon which the vibrations are recorded is formed into an endless or continuous loop by cutting this segment from the supply spool and suitably connecting the ends of the segment together. The magnetic tape is continuously moved through or past a reproducing element in the form of a magnetic reproducing head 20, which includes an electro-magnet placed close to the magnetic tape. The reproducing head translates the record into electrical signals corresponding to the vibrations recorded thereon. The electrical signals thus developed by the reproducing head 20 are fed into an amplifier 21 and then transmitted through an adjustable filter 22 to an oscillograph 23 where the seismographic trace is visually reproduced. The endless magnetic tape is set into continuous motion by means of reels 18 driven by a variable speed motor 9. A variable resistor unit 8 is provided in the electrical power supply circuit for the motor 9 to permit varying the speed of the motor.

The oscillograph 23 includes a field magnet 24 and a movable coil 25 which carries a mirror 26. Light from an incandescent lamp 27 is projected upon the mirror 26 for reflection upon a fixed mirror 29. The light reflected by the mirror 29 is subsequently received on a multi-sided mirror 30 which is rotated by a motor 31. The light reflected by the mirror 30 is received upon a transluscent screen 32 which is concentric with the axis of the mirror 30. Rotation of the mirror 30 provides the necessary time coordinates to the representation on the screen and the movement of the coil 25 and mirror 26 produced by the signal currents transmitted by filter 22 causes the beam impinging on the screen 32 to deflect itself perpendicularly to the time axis. Such oscillograph devices are well-known in the art and are described, for example, in "Electrical Measurements" by F. A. Laws, McGraw-Hill Book Company, New York, New York, 1917, pages 636 to 637.

The magnetic tape 19 and the revolving mirror 30 are rotated synchronously with respect to each other, thus producing on the screen 32 a non-persistent visual representation of the signals recorded upon the tape 19. Because of the slight luminous retentivity of the screen 32, the visual representation appears to be fixed and can be examined by eye. The speed of the motor 9 can be varied by the resistor 8 to provide a variation in the frequency output of the reproducing head for the purpose described below.

As previously stated, the filter 13 in the recording system is not designed to provide the best frequency characteristics for a particular location but has a band pass characteristic sufficiently wide to pass all frequencies which might be of importance in any area. In order to provide the desired frequency characteristics for a particular area, the adjustable filter 22 is provided in the reproducing system which may be adjusted to establish various filtering conditions. For each set of characteristics of the filter 22 a different visual representation of the record will be presented upon the screen 32. Thus as the band pass characteristic of the filter is changed in a predetermined manner a number of visual representations can be presented upon the screen 32 in succession, enabling an observer to determine the adjustments of the filter which give the best information. The selected signal frequency band may thereafter be permanently recorded, using conventional recording facilities, to provide the maximum amount of interpretive information without requiring additional shooting or rechecking in the field.

After original tests have been made in the particular area, information obtained as to the adjustment of the filter 22 providing the best information, can be used in designing a filter 13 for the recording system which will give maximum response to the frequencies of importance in that particular area. However, even in such cases the adjustable filter 22 will be of value in providing further selection to provide the best possible information.

It is apparent from an examination of the system of Fig. 2 that the band pass characteristic of the adjustable filter 22 depends, in a great measure, on the speed of the motor 9. If the speed of the motor 9 is such that the magnetic tape 19 in the reproducing head moves at the same speed as when the record was made, the filter 22 must be designed to pass those frequencies which actually existed and which were characteristic of the reflected waves. On the other hand, if the speed of the tape during reproducing is less than the speed of formation of the record, then the frequencies reproduced will be correspondingly lower and the effective range of the filter is changed. Because of this relationship between the speed of the motor 9 and the characteristics of the filter 22, it is possible to obtain selective filtering by using a filter having fixed constants and varying the speed of the motor 9. In many instances this method is superior to the method of varying the constants of the filter, since by varying the speed of the motor more simple operation and greater flexibility are obtained.

From the foregoing explanation it will be understood that in practicing the present improved method, the desired information from seismic surveying is obtained by using only one explosive charge and recording all vibrations picked up by the "Geophone" which would be of any possible value in interpretation of the record in any geographic area. Thereafter the recording is repeatedly reproduced and the particular frequency band or bands furnishing the most information in a particular area are selected by visually observing a series of modified reproductions of the record. After the frequency bands furnishing the most information have been determined a permanent recording can be made of these bands for further study and interpretation.

While one embodiment of the invention has been described, it will be understood that various modifications may be made therein which are within the true spirit and scope of the invention as defined in the appended claims.

I claim:

1. The method of analyzing a phonographic record of seismic vibrations which comprises, repeatedly translating said record into electrical signals, translating those signals which are within a predetermined frequency band into a nonpersistent visual reproduction, and changing at will the band of frequencies which are reproduced, whereby the entire range of recorded vibrations may be observed to determine the frequency band of the record containing desired information.

2. In seismic prospecting, the method of analyzing a seismic record obtained by creating a disturbance in the earth at one point and phonographically recording the vibrations resulting from the disturbance at a point removed from said one point which comprises, repeatedly reproducing said seismic record to develop electrical signals corresponding to said vibrations, translating the developed signals within a predetermined frequency band into an instantaneous visual reproduction, and changing the band of signal frequency reproduction, whereby the various visual reproductions may be observed to determine the frequency band containing desired information.

3. In seismic prospecting, the method of analyzing a seismic record obtained by creating a disturbance in the earth at one point and phonographically recording the vibrations resulting from the disturbance at a point removed from said one point which comprises, repeatedly reproducing said seismic record to develop electrical signals corresponding to said vibrations, adjustably filtering the developed signals, translating the filtered signals into an instantaneous visual reproduction, and changing the filtering to transmit signals in various predetermined frequency bands, whereby the various visual reproductions may be observed to determine the frequency band containing desired information.

4. In seismic prospecting, the method of analyzing a seismic record obtained by creating a disturbance in the earth at one point and phonographically recording the vibrations resulting from the disturbance at a point removed from said one point which comprises, repeatedly translating all of said recorded vibrations into electrical signals by a variable speed reproducing unit, passing a band of said signals through a filter adapted to transmit a limited band of frequencies, translating said passed signals into a nonpersistent visual trace, and varying the speed of said reproducing unit to vary the frequency of said signals so that the signals representing different portions of the frequency range covered by said recorded vibrations are passed by said filter, whereby said traces may be observed to determine the setting of said variable speed reproducing unit which will result in production of a trace furnishing desired information.

5. In seismic prospecting, the method of analyzing a seismic record obtained by creating a disturbance in the earth at one point and magnetically recording the vibrations resulting from the disturbance at a point removed from said one point upon a segment of a discontinuous magnetizable element which comprises, forming said segment of said element into a continuous loop for repeated reproduction of the recorded vibrations, repeatedly reproducing as electrical signals the vibrations recorded upon said segment of said element, selecting on a frequency basis different bands of said signals during repeated reproductions of said vibrations, and visually reproducing the selected signals.

6. In seismic prospecting the method of analyzing a seismic record obtained by creating a disturbance in the earth at one point and magnetically recording the vibrations resulting from the disturbance at a point removed from said one point upon a segment of a discontinuous magnetizable element which comprises, forming said segment of said element into a continuous loop for repeated reproduction of the recorded vibrations, repeatedly reproducing as electrical signals the vibrations recorded upon said segment of said element, selecting on a frequency basis different bands of said signals during repeated reproductions of said vibrations, and reproducing in non-persistent visual form the selected signals, whereby the entire range of recorded vibrations may be scanned without permanent recording to determine the particular band of vibration frequencies containing desired information.

7. In seismic prospecting, the method of analyzing a seismic record obtained by creating a disturbance in the earth at one point and magnetically recording the vibrations resulting from the disturbance at a point removed from said one point upon a segment of a discontinuous magnetizable element which comprises, forming said segment of said element into a continuous loop for repeated reproduction of the recorded vibrations, continuously moving said looped segment of said element past a reproducing element to repeatedly reproduce as electrical signals the vibrations recorded upon said segment of said element, filtering said electrical signals to select therefrom only a band of the signals, visually reproducing the selected signals, and changing the speed of movement of said looped segment of said magnetizable element past said reproducing element, thereby to change the vibrations corresponding to the band of signals filtered and visually reproduced.

8. In seismic prospecting, the method of analyzing a seismic record obtained by creating a disturbance in the earth at one point and magnetically recording the vibrations resulting from the disturbance at a point removed from said one point upon a segment of a discontinuous magnetizable element which comprises, forming said segment of said element into a continuous loop for repeated reproduction of the recorded vibrations, continuously moving said looped segment of said element past a reproducing element to repeatedly reproduce as electrical signals the vibrations recorded upon said segment of said element, filtering said electrical signals to select therefrom only a band of the signals, reproducing in non-persistent visual form the selected signals, and changing the speed of movement of said looped segment of said magnetizable element past said reproducing element, thereby to change the band of signals filtered and visually reproduced and thus provide for scanning of the entire range of recorded vibrations without permanent recording to determine the particular band of vibration frequencies containing desired information.

ROBERT P. GREEN.

REFERENCES CITED

The following references are of record in the file of this patent:

UNITED STATES PATENTS

| Number | Name | Date |
|---|---|---|
| 2,101,408 | Muzzy | Dec. 7, 1937 |
| 2,155,507 | Rieber | Apr. 25, 1939 |
| 2,243,730 | Ellis | May 27, 1941 |
| 2,378,388 | Begun | June 19, 1945 |
| 2,394,990 | Eisler et al. | Feb. 19, 1946 |
| 2,403,982 | Koenig | July 16, 1946 |
| 2,403,984 | Koenig | July 16, 1946 |
| 2,424,218 | Begun | July 22, 1947 |
| 2,425,003 | Potter | Aug. 5, 1947 |
| 2,427,421 | Rieber | Sept. 16, 1947 |